United States Patent [19]
Weiss

[11] Patent Number: 5,383,585
[45] Date of Patent: Jan. 24, 1995

[54] CHILD CARRIER AND STROLLER ATTACHABLE TO A BICYCLE

[76] Inventor: Edward J. Weiss, 10595 SW. 62nd Ave., Miami, Fla. 33156

[21] Appl. No.: 126,698

[22] Filed: Sep. 17, 1993

[51] Int. Cl.6 .............................. B62B 7/12; B62J 1/16
[52] U.S. Cl. ..................................... 224/31; 224/42.01; 280/30; 297/130; 297/195.13
[58] Field of Search ..................... 224/31, 32 A, 42.01; 297/130, 195.13, 243; 280/30, 47.4, 47.41

[56] References Cited

U.S. PATENT DOCUMENTS

| | | | |
|---|---|---|---|
| 4,685,688 | 8/1987 | Edwards | 280/30 |
| 4,762,331 | 8/1988 | Tucker et al. | 280/30 |
| 4,946,180 | 8/1990 | Bael | 280/47.4 X |
| 5,071,146 | 12/1991 | Lewis et al. | 280/30 |
| 5,104,134 | 4/1992 | Cone | 280/30 |

Primary Examiner—Renee S. Luebke
Attorney, Agent, or Firm—Robert M. Downey

[57] ABSTRACT

A child carrier adapted to be removably attached to a bicycle and having a seat portion, a backrest and a footrest portion. A front wheel assembly is attached to an underside of the footrest portion and a rear wheel assembly and handle assembly are movably fitted to the backrest portion; the rear wheel assembly and handle assembly each being independently and selectively movable between a range of vertically adjusted, locked positions including a stowed position and an operable position, the operable position defining a stroller mode wherein the carrier, once removed from the bicycle, functions as a childs stroller.

9 Claims, 3 Drawing Sheets

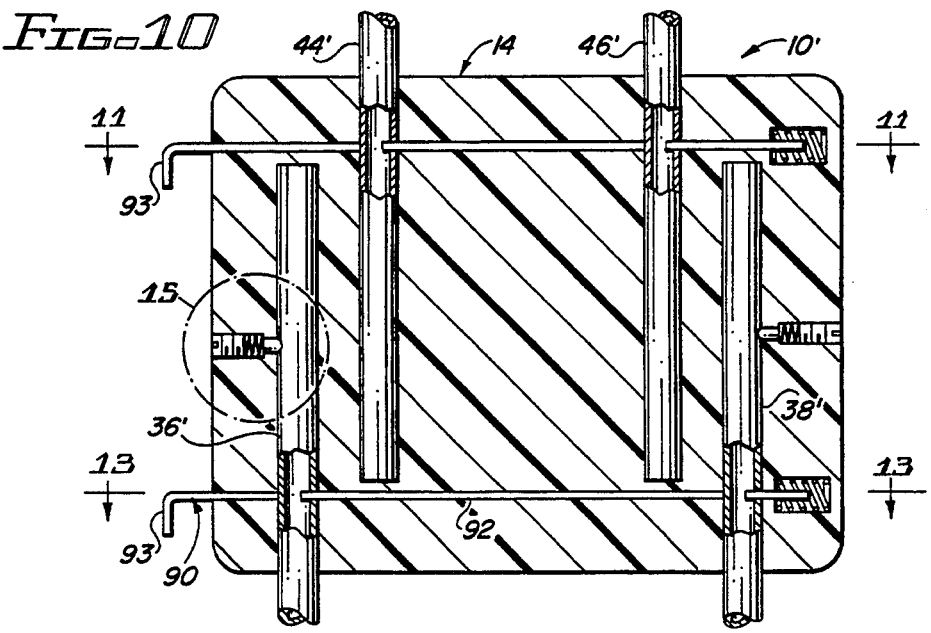
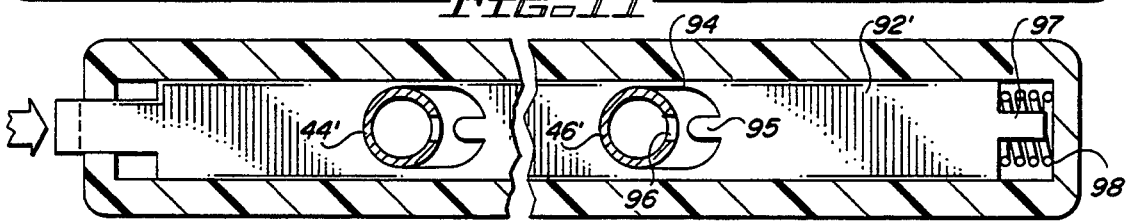
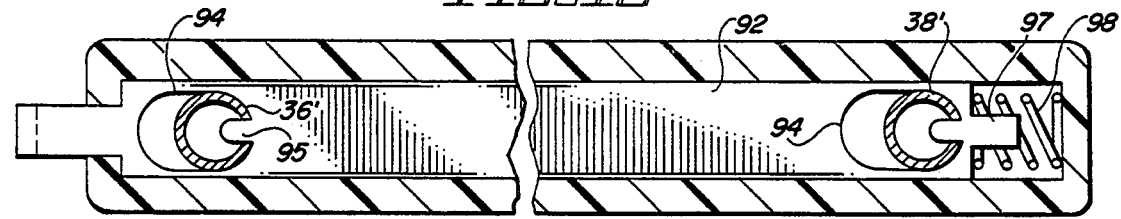
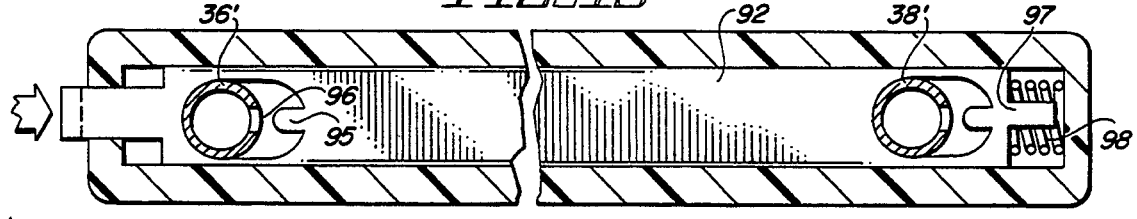

CHILD CARRIER AND STROLLER ATTACHABLE TO A BICYCLE

BACKGROUND OF THE INVENTION

1. Field of the Invention

The present invention relates to child and infant carriers for bicycles having stroller conversion capabilities so that the carrier can be converted to a childs stroller once removed from the bicycle.

2. Description of the Related Art

For years, bicycling has remained popular with people of all ages as a source of leisure and exercise. Thus, it is not surprising that bicycling continues to be one of the most popular outdoor family activities. More recently, the number of people who ride bicycles at least once a week for exercise and enjoyment has reached record numbers. While people of all ages can enjoy bicycling, smaller children and infants are generally restricted to riding tricycles or small bikes with training wheels in close proximity to their house, usually in the driveway, patio and sidewalk. Because of the limited mobility of small children, many parents have equipped their bicycles with a child or infant carrier to support their child so that the whole family can enjoy more extensive bicycling trips.

There are numerous child and infant carriers available on the market today, all of which mount to an adult's bicycle with some type of mounting bracket structure. For the most part, these carriers mount behind the adult's seat above the rear wheel of the bicycle. Some carriers are more easily attached and removed to the bicycle, but all are generally designed to provide a comfortable and generally safe seat for an infant or child up to approximately forty pounds. While the bicycle infant carriers available on the market today certainly provide an effective means of allowing the entire family to enjoy more extensive bicycling trips and tours, a problem is generally encountered when the family reaches a resting area or destination such as a shopping center, park or other location congested with pedestrians and where it is desirous to leave their bicycles in favor of walking. In these situations, infants or small children who cannot walk long distances must be carried by their parents. This practice can prove to be tiring and frustrating to both children and the parents who are left carrying them wherever they go. Ordinarily, when travelling to various locations by car, most parents take along a stroller so that they can wheel their children around, especially when walking long distances. Unfortunately, it is extremely difficult and hazardous to attempt to carry along a stroller on a bicycle, especially when the bicycle is already loaded to capacity with the bicycle infant/child carrier and child.

In an attempt to overcome this problem, there have been lightweight strollers designed which are adapted for attachment to a bicycle infant carrier. These strollers are collapsible and have a sling type seat. When attached to the carrier on the bicycle, the sling seat drapes within the seating area of the carrier and the stroller is then attached to the carrier at various locations. While the stroller folds and collapses at several points when attached to the carrier, it is still quite cumbersome and extends substantially beyond the dimensions of the carrier. Depending on the size and style of the bicycle, this type of stroller may interfere with the rider while pedaling as well as various structure on the bicycle.

Accordingly, in view of the problems associated with bicycle infant/child carriers in the present art, there exists a need for a compact child/infant carrier which is easily attached and removed from a bicycle and quickly convertible to a stroller so that the need for carrying a separate stroller is eliminated.

SUMMARY OF THE INVENTION

The present invention is directed to a convertible child or infant carrier/stroller assembly which is structured to be easily attached and removed from a supporting bracket structure on a bicycle. The child carrier assembly of the present invention includes a rear wheel assembly which is retractable and extendible between a stowed position and operable position, respectively. Additionally, a handle assembly is provided which is also collapsible and extendible between a stowed and operable position. Once removed from the supporting bracket structure on the bicycle, the rear wheel assembly and handle assembly on the carrier are extended to the operable position, thus defining a stroller. A front wheel assembly is further provided and is preferably fixedly attached to an underside of a footrest portion of the carrier.

In one preferred embodiment, the child carrier/stroller assembly of the present invention is designed for use in combination with an existing bicycle child carrier, wherein the assembly of the present invention effectively transforms the carrier into a convertible bicycle child carrier/stroller. In this embodiment, both the rear wheel assembly and handle assembly include a pair of spaced apart parallel posts which mount to a rear surface of a backrest portion of the carrier using a mounting plate. The mounting plate includes four (4) vertically aligned channels which are each sized and configured for sliding receipt of a respective one of the posts of the wheel and handle assemblies. Once attached to the rear surface of the backrest portion of the carrier, the mounting plate effectively captures the posts within the vertically aligned channels such that the posts are only able to move vertically between a range of vertically adjusted positions. Locking means are provided for both the wheel assembly and handle assembly to facilitate selective locking thereof at one of the vertically adjusted positions, including a fully stowed position and an operable position.

In another preferred embodiment, the rear wheel assembly and handle assembly are movably and adjustably fitted within a housing integrally formed with the backrest portion of the carrier. Similar to the first embodiment, the rear wheel assembly and handle assembly each include a pair of spaced apart, parallel posts which are structured to extend substantially vertically within the interior of the housing on the backrest portion of the carrier. The interior of the housing is provided with guide means to effectively guide and maintain the posts of both the rear wheel assembly and handle assembly in substantially vertical alignment, permitting the rear wheel assembly and handle assembly to be selectively vertically adjusted throughout a range of locked positions. Lock means are provided to facilitate locking of the rear wheel assembly and handle assembly at each of the locked, adjusted positions, including a stowed position and an operable position.

In each of the embodiments, the front wheel assembly includes left and right wheels which are preferably fixedly attached to a respective left and right side of the underside surface of the footrest portion. The front wheel assembly may be provided with swivel means to allow swiveling of the left and right wheels when the carrier assembly is being used as a stroller. Wheel lock means may be provided so that once attached to the bicycle, the front wheels can be locked into place, thus preventing unwanted movement which may interfere with the bicycle and rider.

With the foregoing in mind, it is a primary object of the present invention to provide a compact combination bicycle child carrier and stroller which is easily attachable and removable from a bicycle and which further easily converts between a child or infant carrier for a bicycle and a stroller when removed from the bicycle.

It is another object of the present invention to provide a compact carrier and stroller assembly which fixedly attaches to an existing bicycle infant carrier so as to effectively convert the conventional bicycle infant carrier to a convertible carrier/stroller.

It is yet a further object of the present invention to provide a compact, substantially lightweight convertible child carrier and stroller for a bicycle which includes a retractable and extendible wheel and handle assembly to facilitate quick conversion between a bicycle child carrier and a stroller.

It is still a further object of the present invention to provide a convertible bicycle child carrier/stroller which closely resembles a conventional type carrier which is minimally restrictive to the comfort and safety of the rider and child when attached to the bicycle.

These and other objects and advantages of the present invention will be more readily apparent in the description which follows.

BRIEF DESCRIPTION OF THE DRAWINGS

For a fuller understanding of the nature of the present invention reference should be had to the following detailed description taken in connection with the accompanying drawings in which:

FIG. 10 is a rear sectional view of the adjustable rear wheel and handle assembly of the embodiment of FIG. 9.

FIG. 11 is a sectional view taken along the plane of line 11—11 of FIG. 10, illustrating a handle locking means in a locked position.

FIG. 12 is an identical view of FIG. 11 illustrating the handle locking means in an unlocked position.

FIG. 13 is a sectional view taken along the plane of line 13—13 of FIG. 10, illustrating a wheel assembly locking means in a locked position.

FIG. 14 is an identical view to FIG. 13 illustrating the rear wheel assembly locking means in an unlocked position.

Like reference numerals refer to like parts throughout the several views of the drawings.

DETAILED DESCRIPTION OF THE PREFERRED EMBODIMENT

Figure 1:
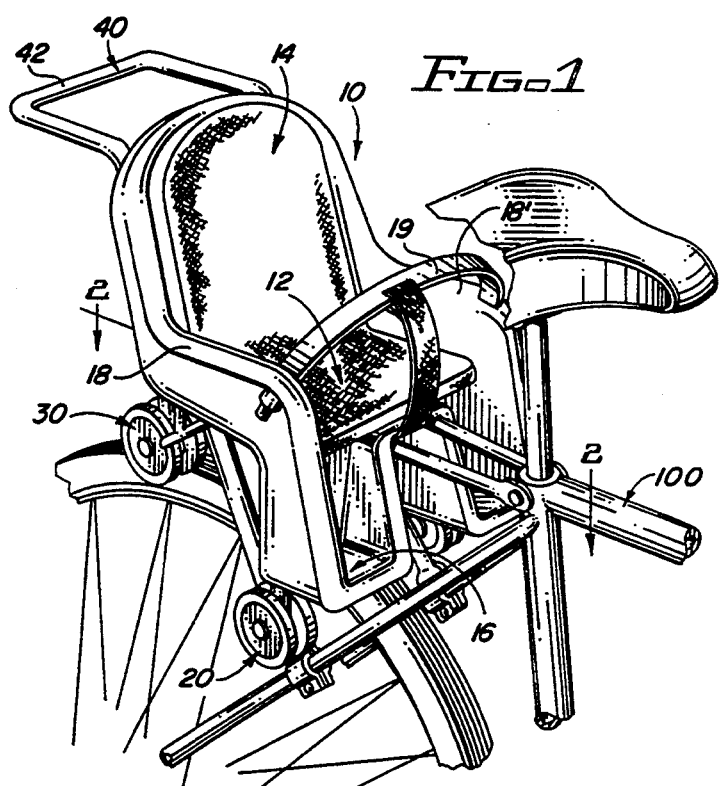
FIG. 1 is a perspective view illustrating the child carrier and stroller assembly of the present invention attached to the frame of an adult bicycle using a mounting bracket structure.
Figure 2:
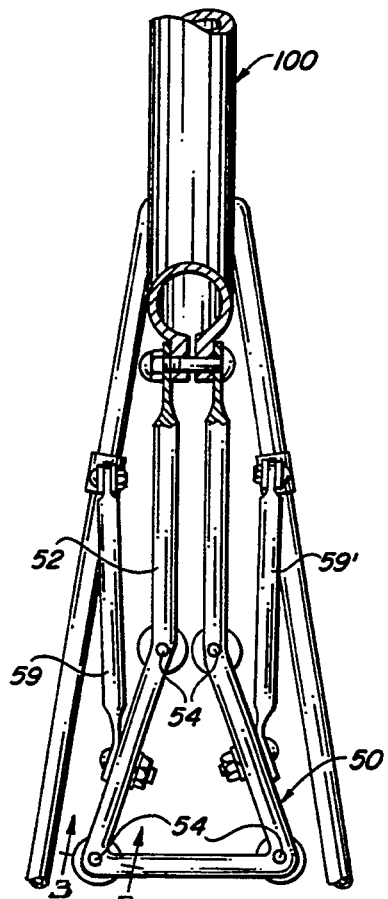
FIG. 2 is a top plan view, taken along line 2—2 of FIG. 1, illustrating the mounting bracket structure for use in releasably attaching the carrier and stroller assembly of the present invention to a bicycle.
Figure 3:
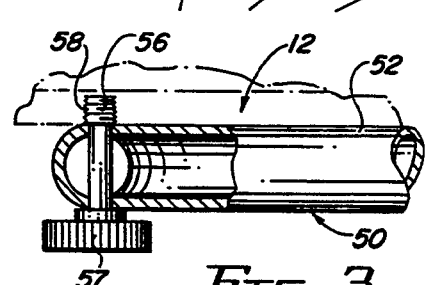
FIG. 3 is an isolated view, in partial section, illustrating a threaded attachment member for attaching the carrier and stroller assembly to the bracket structure on the bicycle.

Referring to the various figures of the drawings, and initially FIGS. 1-3, the present invention is directed to a child carrier, generally indicated as 10, adapted to be mounted to the frame of a bicycle 100. The child carrier 10 is specifically designed to convert between a bicycle child carrier, when mounted to the bicycle 100, and a child or infant stroller once removed from the bicycle.

The carrier 10 includes a molded structure resembling a chair including a seat 12, a backrest 14, a footrest portion 16 and arm rests 18, 18'. The carrier 10 is also provided with a child safety belt 19 adapted to be secured about the child's or infant's waist or lower torso to prevent the child or infant from being inadvertently thrown or dislodged from the carrier 10.

An important feature of the present invention is the adaptation of a stroller assembly to the above-described carrier 10, including a front wheel assembly 20, a rear wheel assembly 30 and a handle assembly 40. The front wheel assembly 20, rear wheel assembly 30 and handle assembly 40 are specifically structured and disposed to facilitate conversion of the carrier 10 between a bicycle child or infant carrier when mounted to the bicycle 10 and a stroller when the carrier 10 is removed from the bicycle 100.

A mounting assembly 50 for mounting the carrier 10 to the bicycle 100 is shown in FIGS. 2 and 3. While the particular mounting assembly 50 shown is believed to be a satisfactory and effective means for removably mounting the carrier 10 to the bicycle 100, it is contemplated that other alternative means of mounting using various style brackets and hardware to suit the particular bicycle may be used within the spirit and scope of this invention. In the particular embodiment shown in FIGS. 2-3, the mounting assembly 50 includes a mounting bracket 52 designed for attachment to the frame of the bicycle 100 having four apertures 54 therein, for receipt of threaded fastening elements 56 therethrough. The mounting bracket 52 is structured for mating engagement with a bottom surface of the seat 12 of the carrier 10 as best illustrated in FIG. 3. The threaded fastening elements 56 each include a knob 57 at one end and are adapted for threaded engagement within threaded bores 58 in the bottom of the seat 12. The bracket 52 mounts to the frame of the bicycle 100 using various hardware, including support braces 59, 59', as shown in FIGS. 2-5.

Figure 4:
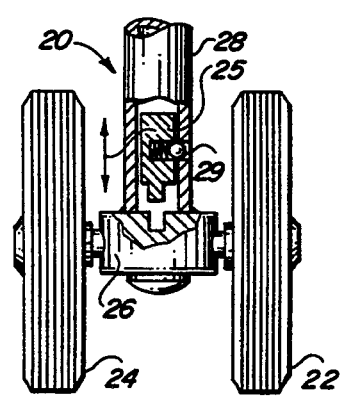
FIG. 4 is an isolated front view of a front wheel assembly of the present invention.
Figure 5:
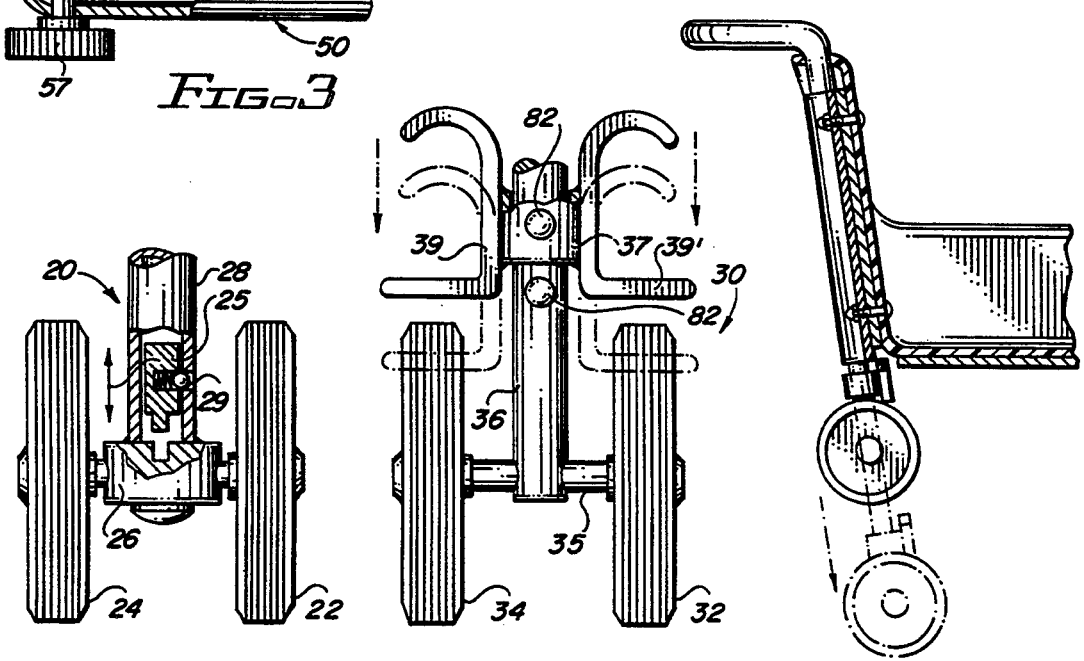
FIG. 5 is a front view of a rear wheel assembly of the present invention.
Figure 6:
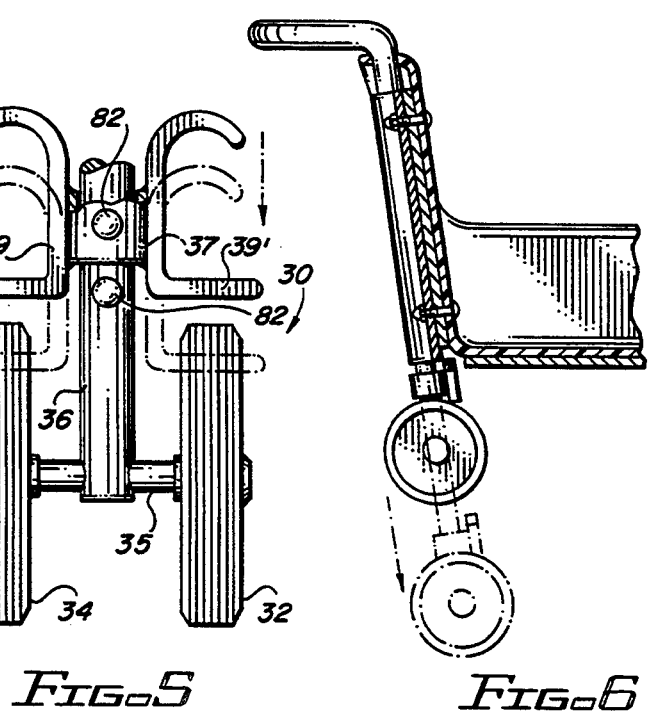
FIG. 6 is an isolated view, shown in partial section, illustrating attachment and movement of a rear wheel and handle assembly on a backrest portion of a child carrier in a first preferred embodiment of the present invention.
Figure 7:
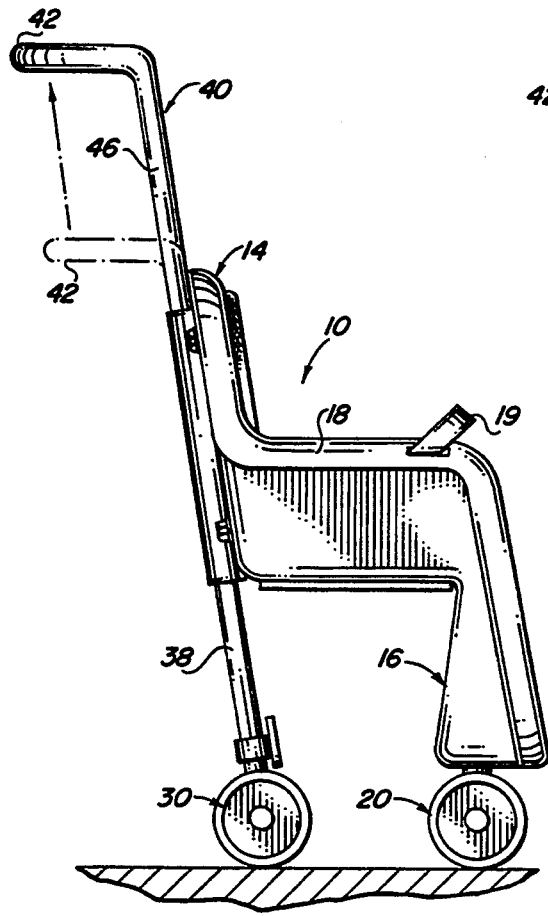
FIG. 7 is a side elevational view of the first preferred embodiment of the present invention, illustrating movement of the handle assembly.
Figure 8:
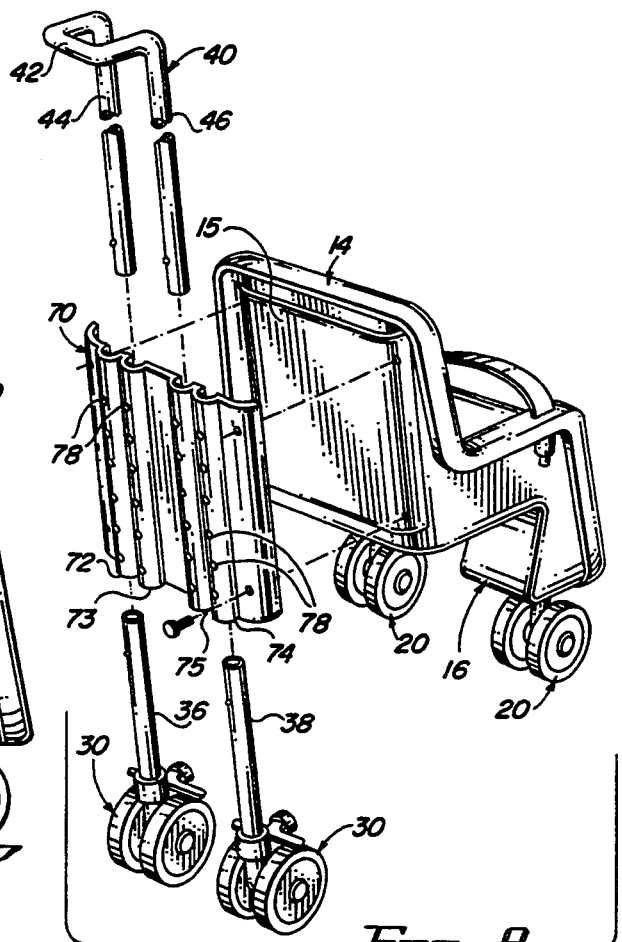
FIG. 8 is an exploded view, shown in perspective, illustrating attachment of the rear wheel assembly and handle assembly of the embodiment shown in FIG. 7 to a backrest portion of the carrier.
Figure 9:
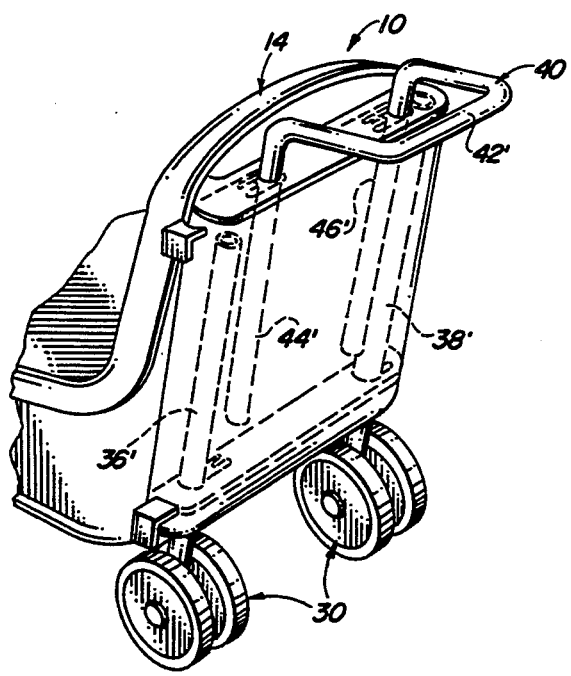
FIG. 9 is a rear perspective view of another preferred embodiment of the child carrier/stroller assembly of the present invention.

Focusing on the particular novel features of the present invention, a first preferred embodiment of the invention is illustrated in FIGS. 6-8. Referring to FIG. 4, the carrier assembly 10 is equipped with front wheel assembly 20 including left and right wheels 22, 24 which are fixedly mounted to an underside of the footrest portion 16 on opposite sides thereof.

The left and right front wheel assemblies 20 preferably include a swivel means to facilitate swiveling movement as shown in FIG. 4. A swivel lock means is provided, including a movable lever 25 structured to be moveable up and down to engage and disengage a rotating collar attached to the wheels. Movement of the lever 25 to an up position disengages the lever from the collar 26, allowing the collar and wheels to rotate or swivel about the axis of the wheel post 28. A spring loaded lock mechanism 29 locks the lever in the up position. The lever 25 is lowered by depressing the lock mechanism 29 allowing downward movement of lever 25 for locking engagement with wheel collar 26.

The rear wheel assembly 30 includes left and right rear wheel sets, each set including wheels 32, 34 rotatably mounted on an axle member 35. The axle member 35 is secured to a lower distal end portion of the respective vertical wheel posts 36, 38 which extend upwardly from the left and right wheel sets in spaced apart parallel relation to one another. A collar 37 is slidably fitted on each wheel post 36, 38 and is moveable between a raised position and lowered position. A pair of brake levers 39, 39' are attached on opposite sides of each collar 37 and are moveable therewith so as to engage the wheels 32, 34 when in the lowered position, thereby defining brake means. A pair of spring loaded buttons 82 protruding out from each of the wheel posts fits within an aperture of the collars so as to lock the collars on each wheel post in the raised or lowered position. The spring loaded buttons 82 are shown in more detail in FIG. 15 and are substantially the same as the locking member used to lock the rear wheel and handle assembly, as described in more detail hereinafter.

The handle assembly 40 includes a horizontal hand grip portion 42 extending between and integrally attached with vertical handle posts 44, 46 which extend downwardly from the hand grip portion 42 in spaced apart, parallel relation to one another.

A mounting plate 70 is specifically designed for attachment to the backrest 14 of the carrier 10 in overlying relation to a rear surface 15 thereof. The mounting plate 70 includes a plurality of generally semi-cylindrical channels formed therein including outboard channels 72, 74 and inboard channels 73, 75. The outboard channels 72, 74 are specifically structured and disposed for individual passage of a respective one of the wheel posts 36, 38 with the mounting plate 70 secured to the backrest 14. In this manner, the wheel posts 36, 38 are permitted to move vertically throughout a range of selected, vertically adjusted positions relative to the mounting plate 70 and carrier 10. Accordingly, vertical adjusted movement of the wheel post 36, 38 serves to adjust the height of the rear wheels 32, 34 relative to the front wheels 22, 24. The channels 72, 73, 74, 75 on the mounting plate 70 all include a plurality of vertically arranged, spaced apart apertures 78 formed therethrough, as best seen in FIG. 8. The apertures 78 on each of the channels define various selected, adjusted positions at which the rear wheel assembly 30 and handle assembly 40 may be locked into place.

Figure 15:
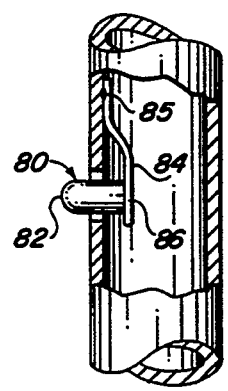
FIG. 15 is an isolated view, shown in partial section, illustrating a locking means for the rear wheel and handle assembly of FIGS. 5-8.

To facilitate locking the rear wheel assembly 30 and handle assembly 40 in one of the adjusted positions, at least one of the wheel posts 36, 38 and at least one of the handle posts 44, 46 is fitted with a locking member 80, as illustrated in detail in FIG. 15. This is substantially the same type of means as is used to lock the collar 37 on the rear wheel sets, as described above. The locking member 80 includes a protruding button 82 which extends outwardly from within the wheel and handle posts for locking receipt in one of the apertures 78 along the vertical channels 72, 73, 74, 75 in the mounting plate 70. A biasing element 84 is attached at one end 85 to an inner surface of the respective wheel and handle post with an opposite end 86 attached to one end of the protruding button 82. The biasing element 84 urges the protruding button 82 outwardly through the respective wheel and handle post so that the button 82 will be caused to be forced through one of the apertures 78 from an inner side of the respective vertical channel on the mounting plate 70. Accordingly, selective adjustment of the handle assembly 40 and rear wheel assembly 30 is achieved by pressing the protruding button 42 inwardly so as to disengage the button 82 from within one of the apertures 78 whereupon vertical movement of the respective wheel or handle post is permitted within the corresponding vertical channel of the mounting plate 70. Once the button 82 reaches the next successive aperture 78 the biasing element 84 causes the button 82 to be forced outwardly in locked position within that particular aperture 78. Further selective adjustment is achieved in the same manner described above.

With reference to FIGS. 9-15, a second preferred embodiment of the present invention is illustrated wherein the rear wheel assembly 30 and handle assembly 40 are partially housed and supported within the backrest 14 of the carrier 10. The wheel posts 36' and 38' extend upwardly through a bottom of the backrest 14 and the handle posts 44' and 46' extend down through a top of the backrest 14 within an interior thereof. The wheel posts 36', 38' and handle posts 44', 46' are each individually contained and vertically movable within a corresponding vertical channel in the backrest, thereby defining guide means for guiding movement of the wheel and handle posts. Lock means 90 including upper and lower lock bars 92', 92 facilitate guided, vertical movement of the handle assembly 40 and rear wheel assembly 30. Additionally, the upper and lower lock bars 92', 92 are structured and disposed to facilitate locking engagement of both the handle assembly 40 and rear wheel assembly 30 in each of the selected, vertically adjusted positions.

As best seen in FIGS. 10-14 the upper and lower lock bars 92', 92 each include a tab 93 extending out from a side of the backrest 14. Additionally, the upper and lower lock bars 92', 92 each include a pair of eliptical slots 94', 94 respectively. The eliptical slots 94' on the upper lock bar 92' are sized and configured for sliding passage of a respective one of the handle posts 44' and 46' therethrough. The eliptical slots 94 on the lower lock bar 92 are sized and configured for sliding passage of the wheel posts 36', 38' therethrough. The upper and lower lock bars 92', 92 each include biasing means 98 at a distal end zone 97 urging the lock bars 92', 92 in a direction towards the tab 93 causing a protruding lock member 95 in each of the eliptical slots 94', 94 to pass through one of a plurality of apertures 96 in a side of each of the respective wheel posts 36', 38' and handle posts 44', 46' thereby locking the rear wheel assembly 30 and handle assembly 40 in one of the vertically adjusted, locked positions. Vertical adjustment of the handle assembly 40 is achieved by forcing the tab 93 on lock bar 92' inwardly against the biasing means 98 so to free the protruding lock member 95 from within the aperture 96 on each of the respective handle posts 44', 46'. Once the protruding lock members 95 are disengaged, sliding movement of the handle posts 44', 46' is permitted. Upon release of the force applied to the tab 93, the biasing means 98 will force the lock bar 92' to move such that the protruding lock members 95 engage a side of each of the respective handle posts 44', 46' until reaching one of a plurality of the apertures 96 along the length of the handle posts, at which point the protruding lock members 95 will be forced into engagement within corresponding apertures 96 by the biasing means 98. Locking and unlocking of the rear wheel assembly to facilitate vertical adjustment thereof is achieved in the same manner as described above for the handle assembly 40.

While this invention has been shown and described in what is considered to be preferred embodiments thereof, it is recognized that departures may be made within the spirit and scope of the invention which should not therefore be limited except by the following claims and within the Doctrine of Equivalents.

Now that the invention has been described,

What is claimed is:

1. A child carrier assembly adapted to be removably mounted to a frame of a bicycle and having a base defining a seat, a backrest portion and a footrest portion, said assembly comprising:
   a front wheel assembly structured for mounting to a bottom of the footrest portion so as to be disposed in supporting relation below the child carrier,
   a rear wheel assembly structured for mounting to the backrest portion of the child carrier so as to be selectively movable and vertically adjustable between a plurality of locked positions including a raised, stowed position and a lowered, operable position,
   said rear wheel assembly including locking means for locking said rear wheel assembly in one of said plurality of locked positions,
   a handle assembly structured to be movably mounted to the backrest portion of the child carrier so as to be selectively vertically adjustable between a plurality of adjusted, locked positions including a raised, operable position and a lower, stowed position, and
   mounting means for movably mounting said rear wheel assembly and said handle assembly to said backrest portion.

2. A child carrier assembly as set forth in claim 1 wherein said front wheel assembly includes left and right wheels, said left and right wheels being attachable to a respective left and right side of the bottom of the footrest portion.

3. A child carrier assembly as set forth in claim 2 wherein said left and right wheels of said front wheel assembly include swivel means to permit directional swivel movement of said left and right wheels relative to the child carrier, said front wheel assembly further including swivel lock means for releasably locking said swivel means to prevent free movement of said left and right wheels of said front wheel assembly.

4. A child carrier assembly as set forth in claim 1 wherein said rear wheel assembly includes a pair of wheel posts disposed in spaced, parallel relation to one another.

5. A child carrier assembly as set forth in claim 4 wherein said handle assembly includes a hand grip portion extending between and interconnected to oppositely disposed parallel handle posts extending substantially perpendicular to said hand grip portion at opposite ends thereof.

6. A child carrier assembly as set forth in claim 5 wherein said mounting means includes a mounting plate for mounting said rear wheel assembly and said handle assembly on said backrest portion, said mounting plate being attachable to a rear surface of said backrest portion and including a plurality of vertically oriented channels, each of said channels being sized and configured to slidably engage and capture a respective one of said handle posts or wheel posts in sandwiched relation between said mounting plate and the rear surface of the backrest portion of the carrier.

7. A child carrier assembly as set forth in claim 6 wherein each of said channels on said mounting plate includes a plurality of spaced apertures therealong, said apertures defining said locked positions of said wheel assembly and said handle assembly.

8. A child carrier assembly as set forth in claim 7 wherein at least one of said handle posts and at least one of said wheel posts includes a locking member having a button and biasing means urging said button outwardly from said posts, said button being sized and configured for locking receipt within said apertures on said channels of said mounting plate.

9. A child carrier for a bicycle comprising:
   an integrally formed structure including a base defining a seat, a backrest portion and a footrest portion,
   a front wheel assembly mounted to a bottom of said footrest portion and disposed therebelow in supporting relation thereto,
   a rear wheel assembly movably mounted to said backrest portion and selectively movable between a plurality of adjusted positions including a fully raised position and a fully lowered position,
   wheel lock means for releasably locking said rear wheel assembly at said plurality of adjusted positions,
   a handle movably mounted to said backrest portion and selectively movable between a plurality of adjusted portions including a raised, operable position and a fully lowered, stowed position,
   handle lock means for releasably locking said handle in each of said plurality of adjusted positions, and
   mounting means for removably mounting the child carrier to the bicycle.

* * * * *